United States Patent
Shatara

(10) Patent No.: US 9,455,853 B2
(45) Date of Patent: Sep. 27, 2016

(54) DEVICE AND METHOD FOR FM DEMODULATION WITH THRESHOLD EXTENSION

(71) Applicant: STMICROELECTRONICS, INC., Coppell, TX (US)

(72) Inventor: Raed Shatara, Northville, MI (US)

(73) Assignee: STMICROELECTRONICS, INC., Coppell, TX (US)

( * ) Notice: Subject to any disclaimer, the term of this patent is extended or adjusted under 35 U.S.C. 154(b) by 0 days.

(21) Appl. No.: 14/586,733

(22) Filed: Dec. 30, 2014

(65) Prior Publication Data
US 2016/0191283 A1    Jun. 30, 2016

(51) Int. Cl.
*H04L 27/14* (2006.01)
*H04L 1/20* (2006.01)

(52) U.S. Cl.
CPC .............. *H04L 27/14* (2013.01); *H04L 1/206* (2013.01)

(58) Field of Classification Search
CPC ....... H04L 27/06; H04L 27/14; H04L 1/206; H04L 27/10; H04L 27/2334; H04B 1/0017
See application file for complete search history.

(56) References Cited

U.S. PATENT DOCUMENTS

| | | | |
|---|---|---|---|
| 4,251,886 A * | 2/1981 | Roza | H04L 25/03127 375/290 |
| 4,837,853 A * | 6/1989 | Heck | H03D 3/242 329/325 |
| 4,991,226 A * | 2/1991 | Bongiorno | H03D 3/003 455/200.1 |
| 5,155,862 A * | 10/1992 | Hansen | H03D 3/005 455/182.1 |
| 6,223,061 B1* | 4/2001 | Dacus | H03C 3/095 455/522 |
| 6,563,892 B1* | 5/2003 | Haartsen | H04L 25/03254 375/346 |
| 6,664,849 B1* | 12/2003 | Taura | H03D 3/002 329/315 |
| 8,094,710 B1* | 1/2012 | Liu | H04L 25/03159 375/233 |
| 8,315,379 B2* | 11/2012 | Masuda | H04B 3/20 379/406.08 |
| 2011/0110459 A1* | 5/2011 | Abraham | H04B 3/54 375/295 |
| 2015/0126127 A1* | 5/2015 | Yang | H04B 17/0005 455/62 |
| 2015/0137883 A1* | 5/2015 | Kang | H03D 3/00 329/315 |

OTHER PUBLICATIONS

Baghdady, "The Theory of FM Demodulation with Frequency-Compressive Feedback," *IRE Transactions on Communications Systems* 10(3):226-245, Sep. 1962.

* cited by examiner

*Primary Examiner* — Jean B Corrielus
(74) *Attorney, Agent, or Firm* — Seed IP Law Group PLLC

(57) ABSTRACT

The present disclosure is directed to an FM demodulator having an extended threshold breakdown point. The FM demodulator uses an arcsin demodulator in combination with a frequency compressive loop to produce a demodulated output signal. The FM demodulator includes three filters that use a coefficient α to determine how the filters behave. The FM demodulator extends the threshold breakdown point of the signal-to-noise ratio of the FM signal beyond traditional levels, allowing the FM demodulator to work at long distances from the broadcasting antenna.

20 Claims, 5 Drawing Sheets

DEVICE AND METHOD FOR FM DEMODULATION WITH THRESHOLD EXTENSION

BACKGROUND

1. Technical Field

The present disclosure is directed to FM demodulation and, in particular, FM demodulation having an extended threshold using an arcsin demodulator.

2. Description of the Related Art

Frequency modulation (FM) is a common method of encoding information. FM signals can generally be represented by the equation $$S(t) = A_c \cos(\omega_c t + \phi(t))$$

where $A_c$ is the amplitude, $\omega_c$ is the carrier frequency in radians, and $\phi(t)$ is the information signal. The information signal can be written as $$\varphi(t) = 2\pi k_f \int_0^t m(\tau) d\tau$$

where m(t) is the modulating signal, and $k_f$ is constant and equal to the peak frequency deviation $f_d$ when m(t)=1. The modulation index, $\beta$, can be written as $$\beta = \frac{\text{Peak RF frequency deviation}}{\text{Maximum Modulating baseband frequency}} = \frac{f_d}{f_{max}}.$$

A common problem with FM demodulation, especially in mobile FM radios, such as those in a vehicle, is that the signal strength can vary significantly as the car moves, causing harsh sounds. In particular, when the FM receiver is too far from the broadcasting antenna, the signal strength can be drastically reduced, making it difficult or impossible for traditional FM demodulators to function. Another problem occurs when the FM signal is reflected off surfaces. When this occurs, the FM receiver will receive two signals simultaneously, one directly from the broadcasting antenna, and another that has been reflected off a nearby surface, such as a building. The reflected signal may be out of phase with the direct signal because of the additional distance traveled, resulting in destructive interference. This destructive interference reduces the strength of the signal that is received at the FM demodulator. One issue associated with these circumstances in particular is the FM threshold effect, which can occur when the amplitude of the noise is comparable to or higher than the amplitude of the FM signal itself. When this occurs, demodulation of the signal rapidly breaks down.

The threshold effect can be seen in FIG. 1, where the signal-to-noise ratio (S/N or SNR) is generally linear for higher levels of carrier-to-noise ratio (p), but at a certain threshold point, the signal-to-noise ratio has a dramatic downward turn. To the left of this threshold point, the FM demodulator rapidly deteriorates.

The output signal-to-noise ratio of an FM system above the threshold region is given by $$SNR_{out} = 3\beta^2(\beta+1)\rho.$$

However, when the threshold breakdown region is included, the output SNR is $$SNR_{out} = \frac{3\beta^2(\beta+1)\rho}{1 + \frac{24}{\pi}\beta(\beta+1)\rho e^{(-\rho)}}.$$

The carrier-to-noise ratio, $\rho$, is given by $$\rho = \frac{A_c^2}{2N_0 B_{IF}}$$

where $B_{IF}$ is the bandwidth of the IF filter in the receiver and $N_0/2$ is the two-sided power spectral density of the white noise.

As shown in FIG. 2, when the FM threshold effect occurs, the phase angle, $\theta(t)$, of the signal can abruptly increase or decrease by $2_{TT}$ radians in a short period of time. This causes an impulse in the signal having an area of $2_{TT}$, and results in a "click" noise that can be heard by the user. The click noise generally indicates that the FM threshold has been reached, and the noise is greater than the signal.

There is a need for an FM demodulator that will extend the threshold beyond the current levels.

BRIEF SUMMARY

One embodiment of the present disclosure is directed to an FM demodulator having an extended threshold breakdown point. The FM demodulator uses an arcsin demodulator in combination with a feedback loop having an error circuit to produce an output signal that has a linear relationship between the signal-to-noise ratio and the carrier-to-noise ratio for a wider range of carrier-to-noise ratios. The FM demodulator also includes three filters that filter signals based on a coefficient $\alpha$. According to one embodiment, the coefficient $\alpha$ can be adjusted automatically based on signal strength, frequency deviation and distortion levels of the FM signal.

According to a further embodiment, a first mixer receives the FM signal and a signal from the error circuit, and produces an error difference signal to the first filter. The first filter then produces a signal to the arcsin demodulator, which demodulates the signal. The arcsin demodulator provides a signal to the second filter, which provides a signal to the error circuit and to a third filter. The third filter produces an output signal of the FM demodulator.

A benefit of an FM demodulator in accordance with the present disclosure is an extended threshold breakdown point, allowing the FM demodulator to demodulate FM signals having a low signal strength. With the principles as taught herein, an FM demodulator is able to demodulate an FM signal that would not be possible with traditional FM demodulation methods, such as when the FM receiver is a long distance from the broadcasting antenna, or when destructive interference from reflected signals are present.

DETAILED DESCRIPTION

Figure 1:
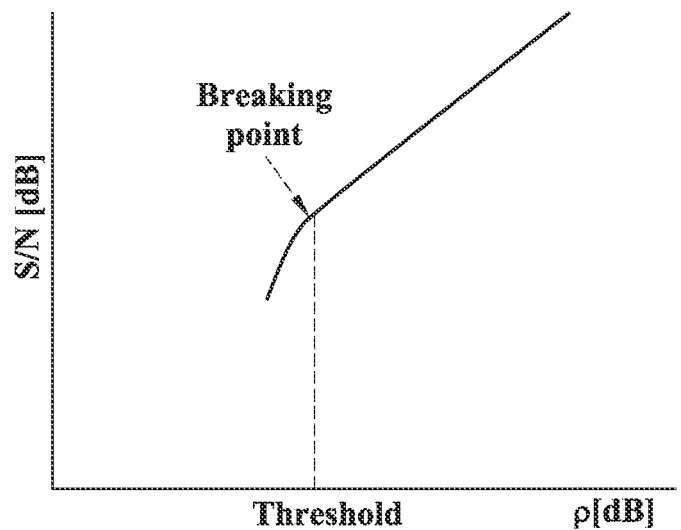
FIG. 1 shows a signal-to-noise ratio of an FM signal having a threshold breakdown effect according to the prior art.
Figure 2:
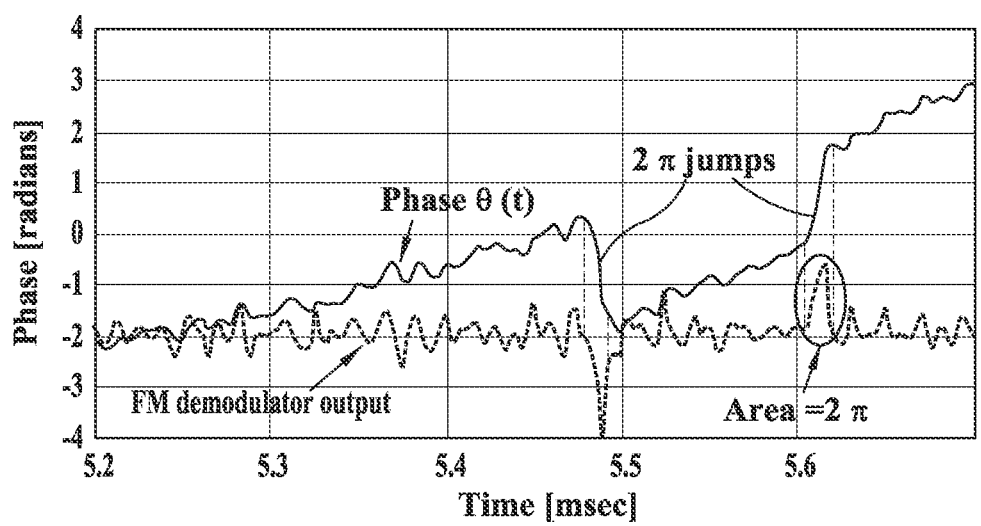
FIG. 2 shows a phase of an FM signal having abrupt $2_{TT}$ jumps as a result of the threshold breakdown effect according to the prior art.

In the following description, certain specific details are set forth in order to provide a thorough understanding of the various embodiments of the disclosure. However, one skilled in the art will understand that the disclosure may be practiced without these specific details. In some instances, well-known structures associated with FM demodulation have not been described in detail to avoid obscuring the descriptions of the embodiments of the present disclosure.

Unless the context requires otherwise, throughout the specification and claims that follow, the word "comprise" and variations thereon, such as "comprises" and "comprising," are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the drawings, identical reference numbers identify similar features or elements. The size and relative positions of features in the drawings are not necessarily drawn to scale.

Figure 3:
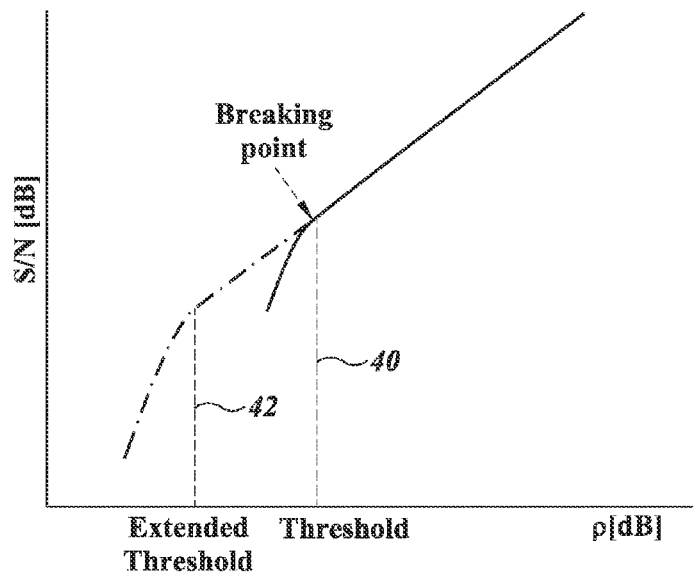
FIG. 3 shows a signal-to-noise ratio of an FM signal having an extended threshold breakdown according to one embodiment of the present disclosure.

FIG. 3 shows the signal-to-noise ratio of an FM signal having an extended breakdown threshold 42. In the graph of FIG. 3, the carrier-to-noise ratio ρ is on the X-axis, and the signal-to-noise ratio S/N is on the Y-axis. The linear portion of the S/N ratio extends past the traditional threshold point 40 as the carrier-to-noise ratio ρ decreases. According to one embodiment, the extended threshold 42 may be linear for up to 10 dB longer than the threshold 40 as the carrier-to-noise ratio level decreases.

Figure 4A:
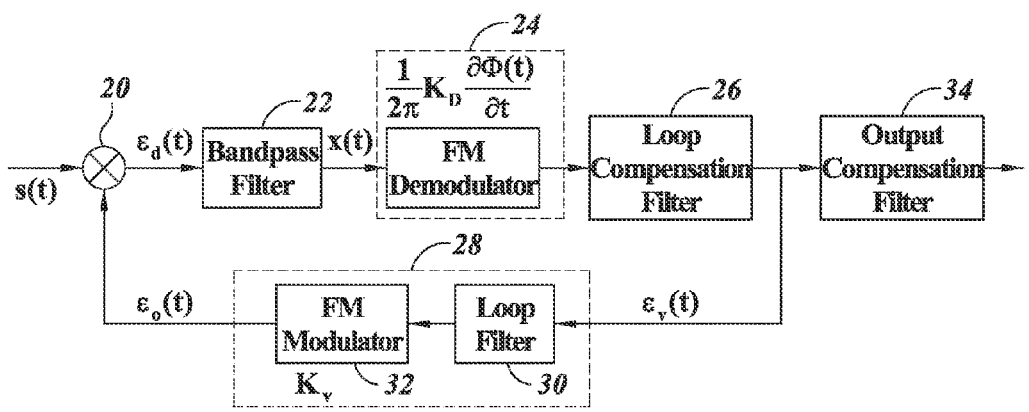
FIG. 4A shows an FM demodulator having a frequency compressive loop according to one embodiment of the present disclosure.

FIG. 4A is an FM demodulator having a frequency compressive feedback (FMFB) according to one embodiment of the present disclosure. The frequency compressive feedback technique will only be briefly explained here. An FM signal s(t) is received at a first input of a first mixer 20, which also receives at a second input an error reference signal $\epsilon_0(t)$. The mixer 20 outputs an error difference signal $\epsilon_d(t)$, which is a received at a first filter 22, generally a band pass filter. The band pass filter 22 outputs a filtered signal x(t), which is received at an FM demodulator 24. The FM demodulator demodulates the filtered signal x(t) based on the equation $$\beta = \frac{\text{Peak RF frequency deviation}}{\text{Maximum Modulating baseband frequency}} = \frac{f_d}{f_{max}}.$$

and outputs a demodulated signal $x_d(t)$. The demodulated signal $x_d(t)$ is received at a loop compensation filter 26, which filters the demodulated signal and outputs a detected error signal $\epsilon_v(t)$. The detected error signal $\epsilon_v(t)$ is fed into an error circuit 28. The error circuit 28 contains a loop filter 30 that receives the detected error signal, and an FM modulator 32 coupled to the loop filter 30 and configured to provide the error reference signal $\epsilon_0(t)$ back to the mixer 20. The loop filter 30 and FM modulator 32 thus create a feedback loop for the FM demodulation system. The detected error signal $\epsilon_v(t)$ is also fed into an output compensation filter 34, which filters the detected error signal, and outputs an output signal.

This FMFB system reduces the FM demodulator noise bandwidth by reducing the modulation index by the feedback factor, resulting in an extended threshold. A mathematical analysis of the FMFB system described above shows the reduced modulation index. For simplification, we let:

$$s(t) = A_c \cos \omega_c t + \phi(t)$$

where $$\varphi(t) = 2\pi k_f \int_0^t m(\tau) d\tau$$

and we let $$\epsilon_0(t) = A_v \cos(\omega_c t + 0(t))$$

where $$\theta(t) = K_v \int_0^t \epsilon_v(\tau) d(\tau)$$

and where $K_v$ is the gain of the FM modulator. This results in $$\varepsilon_d(t) = -\frac{1}{2} A_c A_v \sin(\varphi(t) - \theta(t)) + \frac{1}{2} A_c A_v \sin(2\omega_c(t) + \varphi(t) + \theta(t))$$

and $$x(t) = -\frac{1}{2} A_c A_v \sin(\varphi(t) - \theta(t))$$

and $$\varepsilon_v(t) = \frac{1}{2\pi} K_D \frac{\partial \varphi(t)}{\partial t} - \frac{1}{2\pi} K_D \frac{\partial}{\partial t} \left( K_v \int_0^t \varepsilon_v(\tau) d\tau \right).$$

Solving for $\epsilon_v$ leads to $$\varepsilon_v(t) = \frac{\frac{1}{2\pi} K_D}{\left(1 + \frac{1}{2\pi} K_D K_v\right)} \frac{\partial \varphi(t)}{\partial t}.$$

Substituting $\epsilon_v(t)$ into x(t) leads to $$x(t) = -\frac{1}{2} A_c A_v \sin\left( \varphi(t) - K_v \int_0^t \varepsilon_v(t) dt \right)$$

$$x(t) = -\frac{1}{2} A_c A_v \sin\left[ \frac{1}{\left(1 + \frac{1}{2\pi} K_D K_v\right)} \varphi(t) \right]$$

This results in the modulation index of the original signal $\phi(t)$ being reduced by the factor $1/(1+1/(2_{TT})K_D K_v)$, providing an extension of the threshold.

Figure 4B:
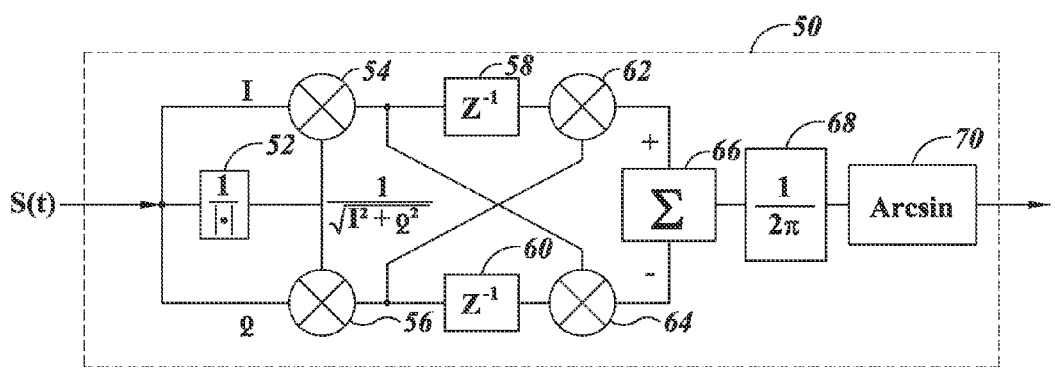
FIG. 4B shows an arcsin FM demodulator according to one embodiment of the present disclosure.

FIG. 4B shows an arcsin demodulator 50 according to one embodiment of the present disclosure. The Arcsin demodulator 50 includes an inverse circuit 52, which receives the incoming signal, and produces an inverse of the absolute value of the signal. An in-phase signal I is received at a first input of a mixer 54, and the inverse of the absolute value of the signal produced by the inverse circuit 52 is received at the second input of the mixer 54, which outputs a mixed in-phase signal. Another mixer 56 receives a quadrature phase signal Q at a first input, and the inverse of the absolute value of the signal produced by the inverse circuit 52 at a second input, and outputs a mixed quadrature phase signal. The mixer 54 outputs the mixed in-phase signal to an inverse circuit 58, which produces an inverse z-transform of the mixed in-phase signal. The mixer 56 outputs the mixed quadrature phase signal to another inverse circuit 60, which produces an inverse z-transform of the mixed quadrature phase signal. A mixer 62 receives at a first input the inverse z-transform of the mixed in-phase signal, and at a second input the mixed quadrature phase signal. Another mixer 64 receives at a first input the inverse z-transform of the mixed quadrature phase signal, and at a second input the mixed in-phase signal. A summing circuit 66 receives the output of the mixer 62 at a first input, and the output of the mixer 64 at a second input, and is configured to output a summed signal that is the output signal of the mixer 64 subtracted from the output signal of the mixer 62. The summed signal from the summing circuit 66 is provided to a divider circuit 68, which divides the summed signal by $2_{TT}$. The divided signal from the divider circuit 68 is then provided to an arcsin circuit 70, which produces a demodulated signal.

Figure 5:
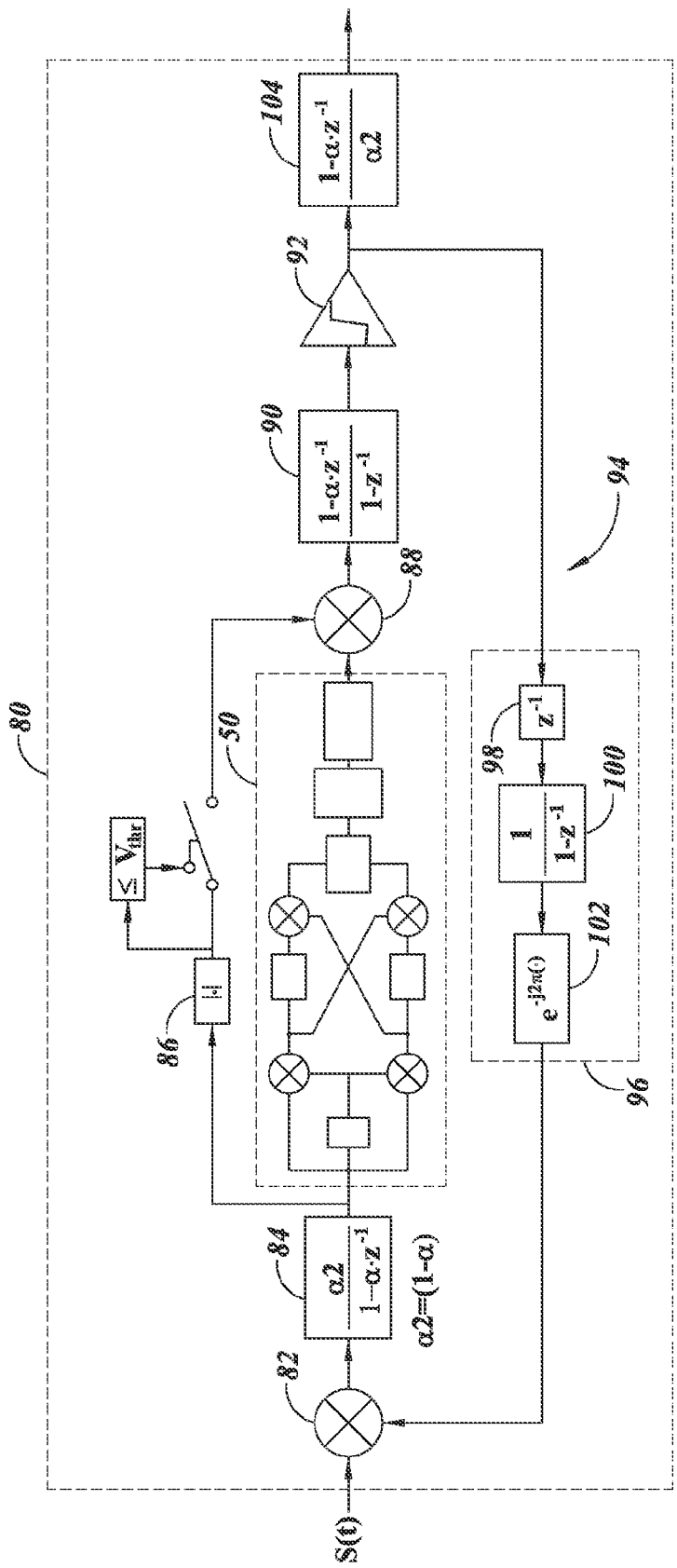
FIG. 5 shows an arcsin threshold extension demodulator according to one embodiment of the present disclosure.

FIG. 5 shows an arcsin threshold extension FM demodulator 80 that incorporates the arcsin demodulator 50. The arcsin threshold extension FM demodulator 80 uses a frequency compressive feedback loop, also referred to as FMFB, in conjunction with the arcsin demodulator 50 to extend the threshold breakdown point of an FM signal.

In the arcsin threshold extension FM demodulator 80, an FM signal s(t) is received at a first input of a mixer circuit 82. The mixer circuit 82 also receives at a second input an error reference signal $\epsilon_0(t)$, and outputs an error difference signal $\epsilon_d(t)$, which is a received at a filter 84. The filter 84 is generally a low pass filter that filters out frequencies based on a coefficient α, but can be any suitable filter such as a band pass filter. According to one embodiment, the filter 84 filters frequencies according to the equation $$\frac{(1-\alpha)}{1-\alpha z^{-1}},$$

where α is based in part on a signal strength indicator, frequency deviation, and distortion. According to some embodiments, the coefficient α will be pre-set when the arcsin threshold extension FM demodulator 80 is manufactured. However, in other embodiments the coefficient α is adjustable on the fly, changing according to the presently detected signal strength. In some embodiments, the coefficient α will automatically change based on the detected signal strength, frequency deviation or distortion, and in other embodiments the coefficient will be user adjustable. The coefficient α is generally between 0.1 and 0.9, and preferably between 0.2 and 0.85. If the signal strength is weak, the coefficient α will be higher, preferably between 0.5 and 0.9. For a medium or strong signal strength, the coefficient α will be a lower value, preferably between 0.1 and 0.5.

The filter 84 outputs a filtered signal x(t), which is received at the arcsin demodulator 50. The arcsin demodulator 50 demodulates the filtered signal x(t), and outputs a demodulated signal $x_d(t)$. In some embodiments, an absolute value circuit 86 also receives the filtered signal x(t) when the signal is below a certain threshold $V_{thr}$. The absolute value circuit 86 produces an absolute value of the filtered signal x(t). A mixer 88 receives at a first input the demodulated signal $x_d(t)$ and at a second input the absolute value of the filtered signal x(t). The mixer 88 outputs a signal to a loop compensation filter 90, which filters out frequencies from the received signal based on the coefficient α. According to one embodiment, the loop compensation filter 90 filters frequencies based on the equation $$\frac{1-\alpha z^{-1}}{1-z^{-1}}.$$

The filter 90 outputs a detected error signal $\epsilon_v(t)$. According to some embodiments, a normalizing circuit 92 is coupled to the output of the filter 90, and normalizes the detected error signal $\epsilon_v(t)$.

The detected error signal $\epsilon_v(t)$ is fed into a feedback loop 94, which is coupled to the mixer circuit 82. The feedback loop 94 contains an error circuit 96, which receives the detected error signal $\epsilon_v(t)$, and produces the error reference signal $\epsilon_0(t)$ to the second input of the mixer circuit 82. According to one embodiment, the error circuit 96 has a delay circuit 98 configured to delay the detected error signal $\epsilon_v(t)$, an integrator circuit 100 coupled to the delay circuit 98 and configured to integrate the signal, and an FM modulator 102, configured to modulate the signal. The FM modulator 102 is coupled to the second input of the mixer circuit 82, and provides the error reference signal $\epsilon_0(t)$ to the mixer 82. The delay circuit 98 is generally a z-transform delay in the form of $z^{-1}$, but may be any suitable delay. The integrator circuit 100 is also generally performed by a z-transform, in the form of $1/(1-z^{-1})$, but may be any other suitable integration technique.

The detected error signal $\epsilon_v(t)$ is also received at a filter 104. The filter 104 is generally an output compensation filter configured to filter frequencies based on the coefficient $\alpha$. Preferably, the filter 104 is configured to filter based on the equation $$\frac{1-\alpha z^{-1}}{1-\alpha}.$$

The filter 104 produces an output signal, which is then received by stereo equipment or the like.

Figure 6:
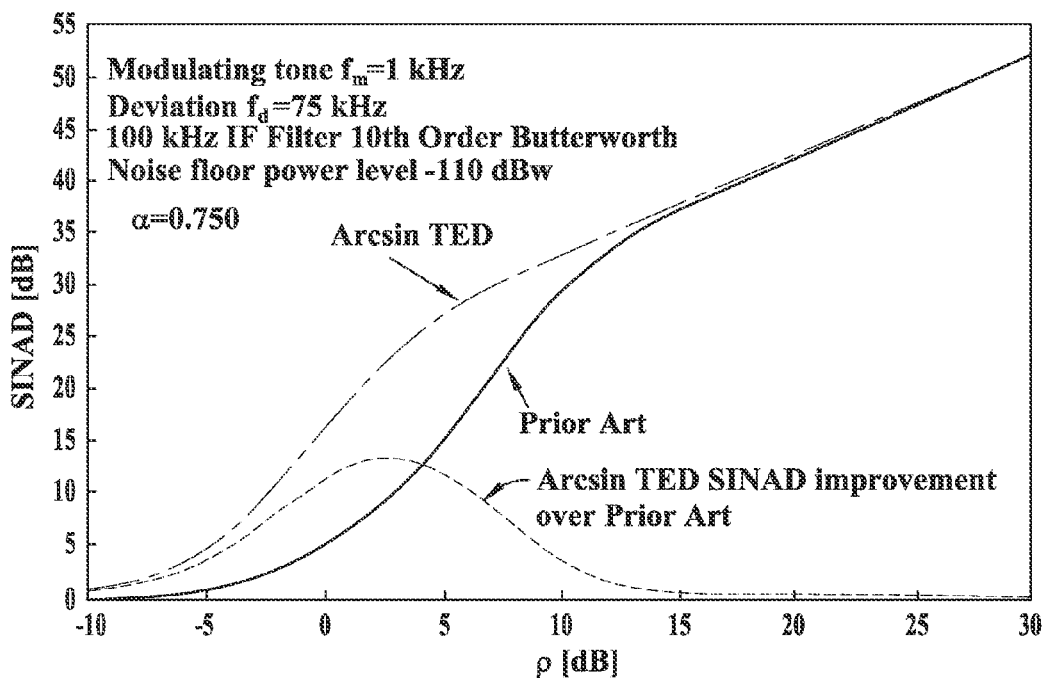
FIG. 6 shows a simulated performance of the arcsin threshold extension demodulator of FIG. 5 at a modulating tone frequency of 1 kHz compared to the prior art according to one embodiment of the present disclosure.
Figure 7:
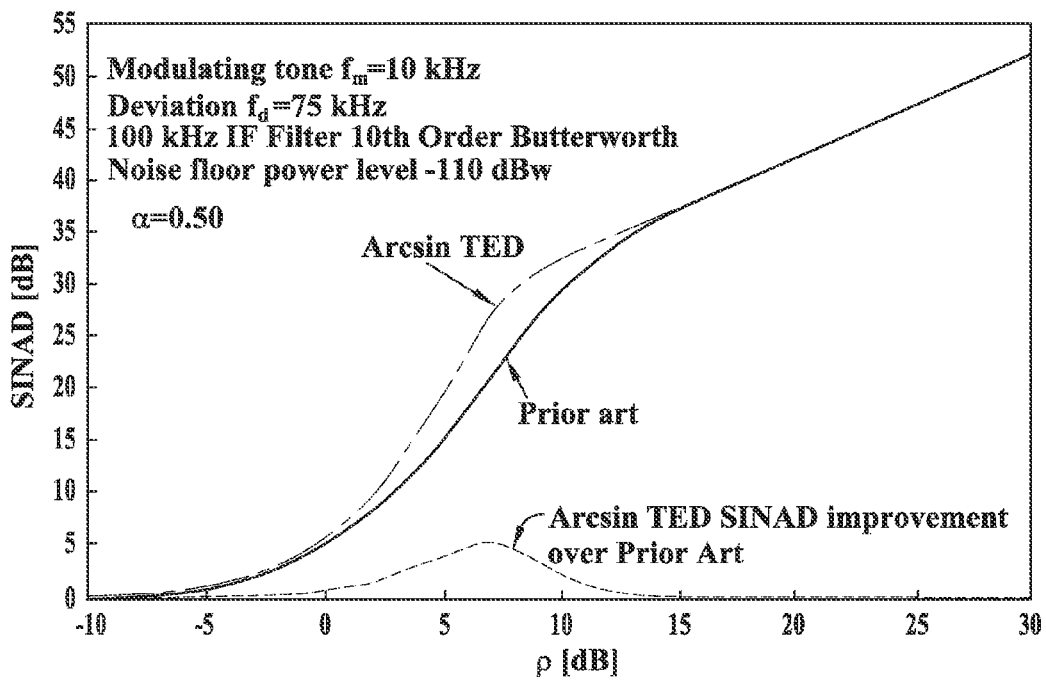
FIG. 7 shows a simulated performance of the arcsin threshold extension demodulator of FIG. 5 at a modulating tone frequency of 10 kHz compared to the prior art according to one embodiment of the present disclosure.

FIGS. 6 and 7 show simulated results of the arcsin threshold extension FM demodulator (Arcsin TED) 80 of FIG. 5 compared to the prior art. FIG. 6 shows the prior art and arcsin threshold extension FM demodulator 80 both with a modulating tone, $f_m$, of 1 kHz, a frequency deviation, $f_d$, of 75 kHz, and with the coefficient $\alpha$ of the arcsin threshold extension FM demodulator 80 set to 0.75. The solid line shows the signal-to-noise and distortion ratio (SINAD) of the prior art as the carrier-to-noise ratio $\rho$ increases, while the dash-dot line shows the SINAD of the arcsin threshold extension FM demodulator 80. The dashed line of FIG. 6 shows the SINAD improvement of the arcsin threshold extension FM demodulator 80 over the prior art. It can be seen from FIG. 6 that the arcsin threshold extension FM demodulator 80 shows a significant improvement in SINAD over the prior art, especially from $\rho$ values of 0 dB to 5 dB. FIG. 7 shows the performance of the arcsin threshold extension FM demodulator 80 compared to the prior art with a modulating tone, $f_m$, of 10 kHz and the coefficient $\alpha$ set to 0.5. In FIG. 7 it can be seen that the arcsin threshold extension FM demodulator 80 again has a significant SINAD improvement over the prior art, especially for $\rho$ values of 5 dB to 10 dB.

Figure 8:
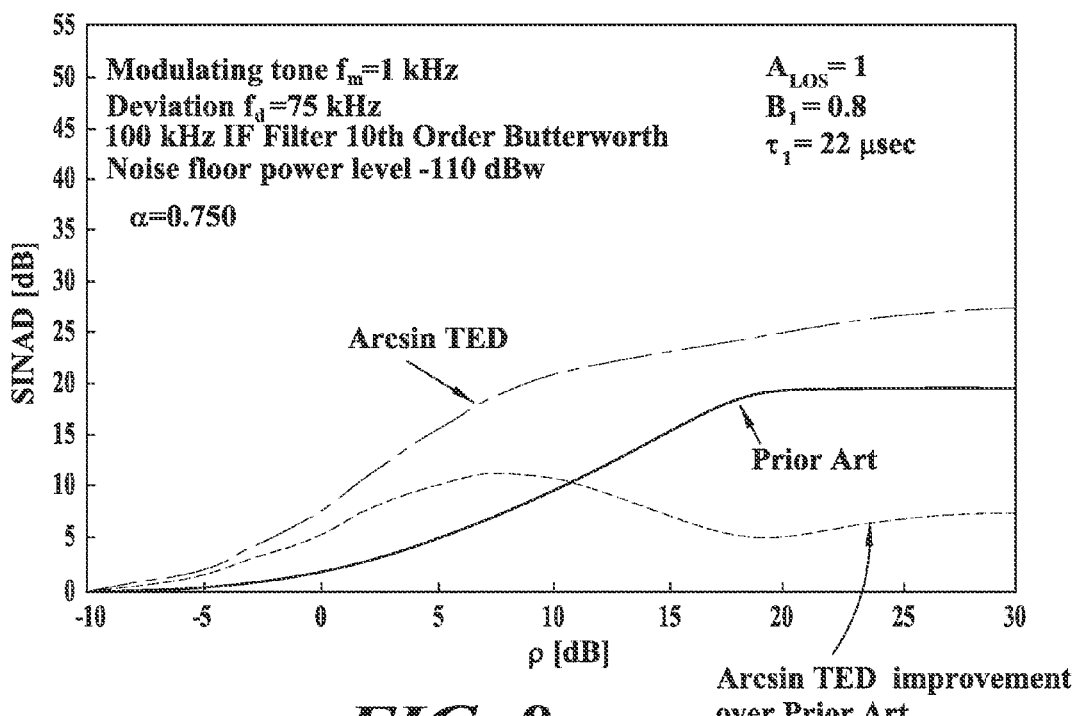
FIG. 8 shows a simulated performance of the arcsin threshold extension demodulator of FIG. 5 with a multipath channel compared to the prior art according to one embodiment of the present disclosure.

FIG. 8 shows the performance of the arcsin threshold extension FM demodulator 80 and the prior art for an FM signal having a multipath channel. Because FM signals are frequently broadcast in cities for use by vehicle radios, a common occurrence in FM signals is for a vehicle to receive the signal as two paths. One path is the direct signal from the broadcasting tower, and a second path is a reflection of the signal off a nearby building. The reflected second signal is delayed by a certain amount because of the additional distance traveled to reflect off the nearby building. When these two signals meet at a vehicle's antenna, they may be constructive or destructive, depending on the delay of the second signal. When the signals are out of phase, they are destructive and the second delayed signal will reduce the amplitude of the signal received at the vehicle's antenna, often resulting in "null" zones for a vehicle.

FIG. 8 shows the SINAD for the arcsin threshold extension FM demodulator 80 and the prior art across varying levels of carrier-to-noise ratio $\rho$. A multi-path channel is simulated by adding a second simulated signal having a delay of 22 μseconds and an amplitude of 0.8 of the original signal. The simulated multipath performance in FIG. 8 is with a modulating tone of 1 kHz, a frequency deviation of 75 kHz, and a coefficient $\alpha$ of 0.75. FIG. 8 shows that the arcsin threshold extension FM demodulator 80 has considerable improvement over the prior art across all levels of carrier-to-noise ratio $\rho$, and especially above $\rho$ values of 0 dB.

Figure 9:
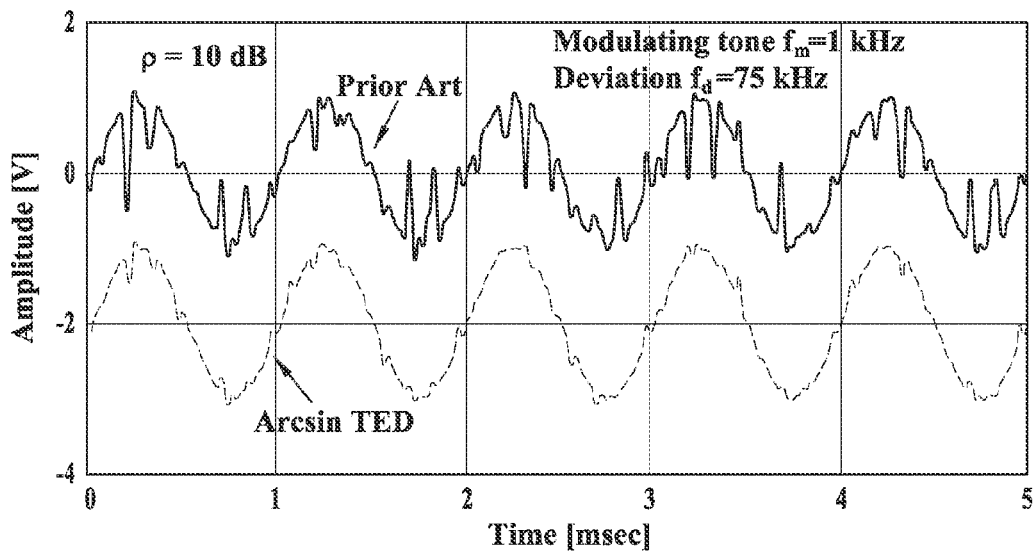
FIG. 9 shows a simulated output signal of the arcsin threshold extension demodulator of FIG. 5 with a multipath channel compared to the prior art according to one embodiment of the present disclosure.

FIG. 9 shows the demodulated output signals from the arcsin threshold extension FM demodulator 80 and the prior art under the simulated multipath conditions of FIG. 8 for a carrier-to-noise ratio $\rho$ of 10 dB. It can be seen from FIG. 9 that the arcsin threshold extension FM demodulator 80 has a much smoother output than the prior art. The assorted sharp peaks and valleys of the prior art output are reduced or removed in the arcsin threshold extension FM demodulator 80 output.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
    a first mixer that receives a frequency modulation (FM) signal and an error reference signal, and produces an error difference signal;
    a first filter coupled to the first mixer that receives the error difference signal and produces a filtered signal having a frequency removed based on a first coefficient;
    an arcsin FM demodulator coupled to the first filter that receives the filtered signal and produces a demodulated signal;
    a second filter coupled to the arcsin FM demodulator that receives the demodulated signal and produces a detected error signal based on the first coefficient at an output;
    an error circuit, coupled to the output of the second filter, that receives the detected error signal and outputs the error reference signal to the first mixer, the error circuit including:
        a delay circuit that receives the detected error signal and produces a delayed detected error signal;
        an integrator circuit, coupled to an output of the delay circuit, that receives the delayed detected error signal and produces an integrated signal; and
        an FM modulator, coupled to an output of the integrator circuit, that receives the integrated signal and produces the error reference signal; and
    a third filter coupled to the output of the second filter, the third filter receiving the detected error signal and producing an output signal.

2. The device of claim 1, wherein the arcsin FM demodulator includes:
    a first inverse circuit coupled to the first filter that receives the filtered signal and produces an inverse of the absolute value of the filtered signal;
    a second mixer that receives an in-phase signal and the inverse of the absolute value of the filtered signal, and produces a mixed in-phase signal, the in-phase signal being an in-phase component of the filtered signal;
    a third mixer that receives a quadrature phase signal and the inverse of the absolute value of the filtered signal, and produces a mixed quadrature phase signal, the quadrature phase signal being a quadrature component of the filtered signal;
    a second inverse circuit coupled to the second mixer that produces an inverse of the mixed in-phase signal;
    a third inverse circuit coupled to the third mixer that produces an inverse of the mixed quadrature phase signal;

a fourth mixer that receives the inverse of the mixed in-phase signal and the mixed quadrature phase signal, and produces a first summing signal; and a fifth mixer that receives the inverse of the mixed quadrature phase signal and the mixed in-phase signal, and produces a second summing signal, wherein the demodulated signal is produced based on the first summing signal and the second summing signal.

3. The device of claim 2, wherein the arcsin FM demodulator further includes:

a summing circuit that receives the first summing signal and the second summing signal, and produces a summed signal;

a divider circuit coupled to the summing circuit that receives the summed signal and produces a divided signal;

an arcsin circuit coupled to the divider circuit that receives the divided signal and provides the demodulated signal to the second filter.

4. The device of claim 3, wherein the divider circuit divides the summed signal by $2\pi$.

5. The device of claim 3, wherein the summing circuit subtracts the second summing signal from the first summing signal.

6. The device of claim 1, wherein the first coefficient is a fixed coefficient.

7. The device of claim 1, wherein the first coefficient is adjustable based on a signal strength indicator.

8. The device of claim 1, wherein the first coefficient is adjustable based on a frequency deviation detector.

9. The device of claim 1, wherein the first coefficient is adjustable based on a distortion detector.

10. The device of claim 1, wherein the first coefficient is $\alpha$, and the first filter is configured to filter frequencies based on the equation $$\frac{1-\alpha}{1-\alpha z^{-1}},$$

where z is a frequency variable.

11. The device of claim 10, wherein the second filter is configured to filter frequencies based on the equation $$\frac{1-\alpha z^{-1}}{1-z^{-1}}.$$

12. The device of claim 11, wherein the third filter is configured to filter frequencies based on the equation $$\frac{1-\alpha z^{-1}}{1-\alpha}.$$

13. A method, comprising:

producing an error difference signal by receiving a frequency modulation (FM) signal and an error reference signal at a first mixer;

filtering the error difference signal based on a first coefficient;

producing a demodulated signal by demodulating the filtered error difference signal at an arcsin demodulator;

producing a detected error signal by filtering the demodulated signal based on the first coefficient;

modulating the detected error signal in an FM modulator to produce the error reference signal, the modulating including:

receiving the detected error signal at a delay circuit;

producing a delayed detected error signal from the delay circuit;

integrating the delayed detected error signal; and producing the error reference signal by modulating the integrated detected signal at the FM modulator;

outputting the error reference signal as an input to the first mixer; and producing an output signal by filtering the detected error signal based on the first coefficient.

14. The method of claim 13, wherein filtering the error difference signal includes:

receiving the error difference signal at a first filter; and filtering the error difference signal based on the equation $$\frac{1-\alpha}{1-\alpha z^{-1}},$$

where $\alpha$ is the first coefficient and z is a frequency variable.

15. The method of claim 14, wherein filtering the demodulated signal includes:

receiving the demodulated signal at a second filter; and filtering the demodulated signal based on the equation $$\frac{1-\alpha z^{-1}}{1-z^{-1}}.$$

16. The method of claim 15, wherein filtering the detected error signal includes:

receiving the detected error signal at a third filter; and filtering the detected error signal based on the equation $$\frac{1-\alpha z^{-1}}{1-\alpha}.$$

17. The method of claim 13, wherein demodulating the filtered error difference signal at the arcsin demodulator includes:

producing an inverse of the absolute value of the filtered error difference signal;

receiving an in-phase signal and the inverse of the absolute value of the filtered error difference signal at a second mixer, the in-phase signal being an in-phase component of the filtered error difference signal;

producing a mixed in-phase signal from the second mixer;

receiving a quadrature phase signal and the inverse of the absolute value of the filtered error difference signal at a third mixer, the quadrature phase signal being a quadrature component of the filtered error difference signal;

producing a mixed quadrature phase signal from the third mixer;

producing an inverse of the mixed in-phase signal;

producing an inverse of the mixed quadrature phase signal;

receiving the inverse of the mixed in-phase signal and the mixed quadrature phase signal at a fourth mixer;

producing a first summing signal from the fourth mixer;

receiving the inverse of the mixed quadrature phase signal and the mixed in-phase signal at a fifth mixer; and producing a second summing signal from the fifth mixer, wherein the demodulated signal is produced based on the first summing signal and the second summing signal.

18. The method of claim 17, further comprising:
receiving the first summing signal and the second summing signal at a summing circuit;
producing a summed signal from the summing circuit;
receiving the summed signal at a divider circuit;
producing a divided signal from the divider circuit;
receiving the divided signal at an arcsin circuit; and
providing the demodulated signal from the arcsin circuit.

19. A device, comprising:
a first mixer that receives a frequency modulation (FM) signal and an error reference signal, and produces an error difference signal;
a first filter coupled to the first mixer that receives the error difference signal and produces a filtered signal having a frequency removed based on a first coefficient;
an arcsin FM demodulator coupled to the first filter that receives the filtered signal and produces a demodulated signal, the arcsin FM demodulator including:
  a first inverse circuit coupled to the first filter that receives the filtered signal and produces an inverse of an absolute value of the filtered signal;
  a second mixer that receives an in-phase signal and the inverse of the absolute value of the filtered signal, and produces a mixed in-phase signal, the in-phase signal being an in-phase component of the filtered signal;
  a third mixer that receives a quadrature phase signal and the inverse of the absolute value of the filtered signal, and produces a mixed quadrature phase signal, the quadrature phase signal being a quadrature component of the filtered signal;
  a second inverse circuit, coupled to the second mixer, that produces an inverse of the mixed in-phase signal;
  a third inverse circuit, coupled to the third mixer, that produces an inverse of the mixed quadrature phase signal;
  a fourth mixer that receives the inverse of the mixed in-phase signal and the mixed quadrature phase signal and produces a first summing signal; and
  a fifth mixer that receives the inverse of the mixed quadrature phase signal and the mixed in-phase signal, and produces a second summing signal, wherein the demodulated signal is produced based on the first summing signal and the second summing signal;
a second filter coupled to the arcsin FM demodulator that receives the demodulated signal and produces a detected error signal based on the first coefficient at an output;
an error circuit coupled to the output of the second filter and receiving the detected error signal and outputting the error reference signal to the first mixer; and
a third filter coupled to the output of the second filter, the third filter receiving the detected error signal and producing an output signal.

20. A method, comprising:
producing an error difference signal by receiving a frequency modulation (FM) signal and an error reference signal at a first mixer;
filtering the error difference signal based on a first coefficient;
producing a demodulated signal by demodulating the filtered error difference signal at an arcsin demodulator, demodulating the filtered error difference signal at the arcsin demodulator including:
  producing an inverse of an absolute value of the filtered error difference signal;
  receiving an in-phase signal and the inverse of the absolute value of the filtered error difference signal at a second mixer, the in-phase signal being an in-phase component of the filtered error difference signal;
  producing a mixed in-phase signal by the second mixer;
  receiving a quadrature phase signal and the inverse of the absolute value of the filtered error difference signal at a third mixer, the quadrature phase signal being a quadrature component of the filtered error difference signal;
  producing a mixed quadrature phase signal by the third mixer;
  producing an inverse of the mixed in-phase signal;
  producing an inverse of the mixed quadrature phase signal;
  receiving the inverse of the mixed in-phase signal and the mixed quadrature phase signal at a fourth mixer;
  producing a first summing signal by the fourth mixer;
  receiving the inverse of the mixed quadrature phase signal and the mixed in-phase signal at a fifth mixer; and
  producing a second summing signal from the fifth mixer, wherein the demodulated signal is produced based on the first summing signal and the second summing signal;
producing a detected error signal by filtering the demodulated signal based on the first coefficient;
modulating the detected error signal in an FM modulator to produce the error reference signal;
outputting the error reference signal as an input to the first mixer; and
producing an output signal by filtering the detected error signal based on the first coefficient.

* * * * *